United States Patent

Smorenburg

[11] 3,969,790
[45] July 20, 1976

[54] POULTRY PROCESSING EQUIPMENT

[75] Inventor: Johannes Jacobus Smorenburg, Abcoude, Netherlands

[73] Assignee: Stork Brabant, B.V., Boxmeer, Netherlands

[22] Filed: Jan. 18, 1974

[21] Appl. No.: 434,621

[30] Foreign Application Priority Data
Jan. 25, 1973   Netherlands...................... 7301113

[52] U.S. Cl............................................... 17/11.1 R
[51] Int. Cl.²........................................ A22C 21/00
[58] Field of Search.................... 17/11.1 R, 11.2, 47

[56] References Cited
UNITED STATES PATENTS

| | | | |
|---|---|---|---|
| 2,305,232 | 12/1942 | Barker | 17/11.1 R |
| 2,977,628 | 4/1961 | Barker et al. | 17/11.2 |
| 3,236,656 | 2/1966 | Wittig | 17/11.1 R |
| 3,561,040 | 2/1971 | Floden | 17/47 |
| 3,596,309 | 8/1971 | Vertegaal | 17/11.1 R |
| 3,703,021 | 11/1972 | Sharp | 17/47 |

FOREIGN PATENTS OR APPLICATIONS

1,292,341   4/1969   Germany.......................... 17/11.1 R

*Primary Examiner*—Louis G. Mancene
*Assistant Examiner*—James D. Hamilton
*Attorney, Agent, or Firm*—Edmund M. Jaskiewicz

[57] ABSTRACT

Apparatus for treating slaughtered poultry comprising a plucking device with a plurality of plucking discs arranged on either side of the path of the poultry, provided with plucking fingers directed towards the path of the poultry, further comprising outflow openings directed towards the path of the poultry, provided in the proximity of the plucking discs and connected to pipes, connected to one or more sources of hot water, hot air, steam or another suitable medium or a mixture thereof, the arrangement being such that during the plucking operation performed by the plucking fingers the poultry can be exposed to the effect of the medium brought thereon via the outflow openings.

6 Claims, 10 Drawing Figures

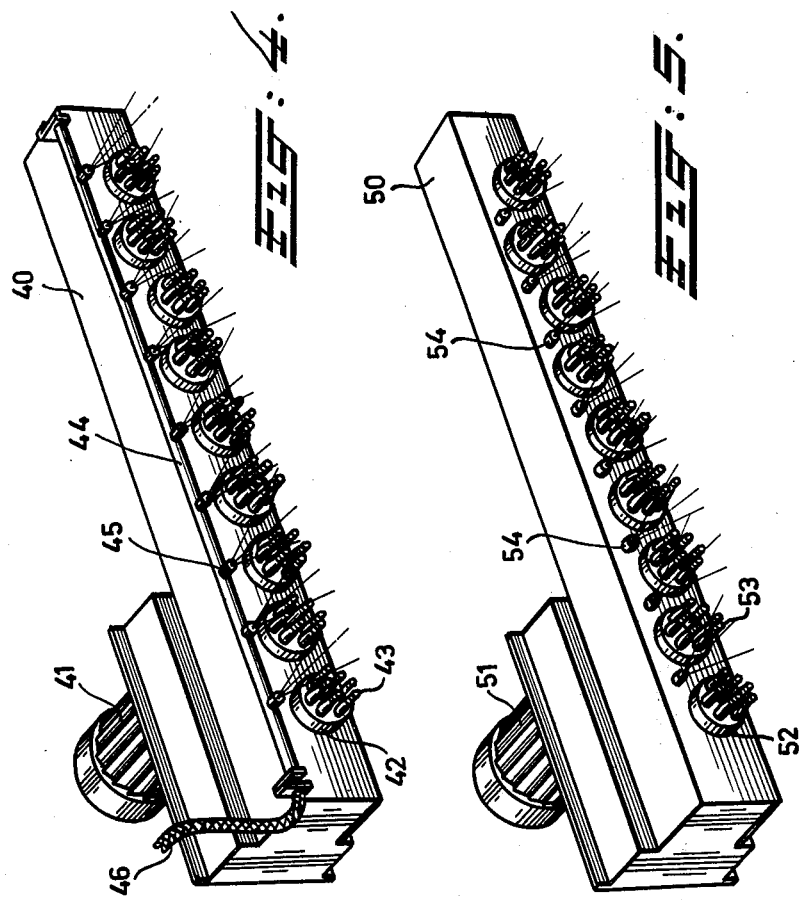

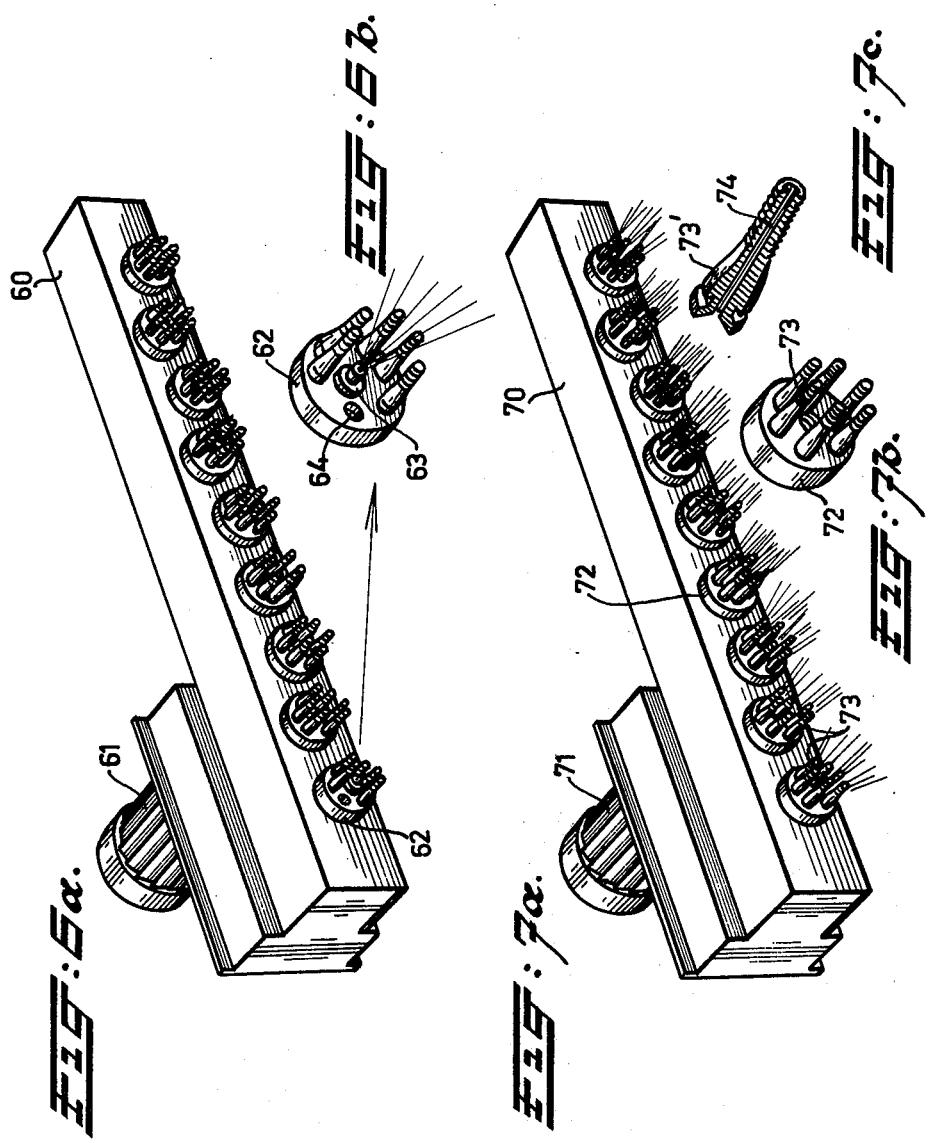

POULTRY PROCESSING EQUIPMENT

BACKGROUND OF THE INVENTION

My invention relates to an apparatus for treating slaughtered poultry which is moved on a conveyor track, hanging by its legs, comprising a plucking device with a plurality of discs, arranged on either side of the path of the poultry, to be driven in rotation and provided with plucking fingers directed towards the path of the poultry.

In the present way of processing poultry, this poultry is, prior to the plucking by means of a plucking machine, passed through a water bath of which the temperature is maintained at a definite value (48°–50° of 58°–60°C). By this treatment (the so-called scalding) is achieved that the subsequent plucking can be performed easier and faster so that the production capacity of a processing line can be increased.

The birds are during the scalding entirely immersed, resulting into a considerable pollution of the used water. The water bath must be renewed frequently, while the discharged water, which contains among other things many bacteria, is a source of environment pollution. Moreover this known treatment requires much energy owing to the necessity of continuously heating large quantities of fresh water.

SUMMARY OF THE INVENTION

The invention aims to eliminate the drawbacks of the known devices. To that end the apparatus is provided with outflow openings, directed towards the path to be followed by the poultry, provided in the proximity of the plucking discs and connected to pipes, connected to one or more sources of hot water, hot air, steam or another suitable medium or a mixture thereof, such that during the plucking operation performed by the plucking fingers the poultry can be exposed to the effect of the medium brought thereon via the outflow openings.

The invention is based on the understanding that the intense treatment of the feather package performed during the plucking operation can be advantageously utilized in order to cause a scalding medium to act upon the skin during this treatment.

Expirements have shown that the combination of the treatments formerly performed as separate operations: "scalding" and "plucking", provides a considerably better product and remarkable economies.

A plucker of the kind as described above has, due to its special construction such an intense effect on the feather package of a bird that just with such a plucker the desired penetration of the scalding medium to the skin of the bird and subsequently an optimal effect is obtained.

The consumption of energy is, as compared with the known scalding devices considerably less, while the water pollution is much smaller. The fact that the conventional scalding device can be omitted results in itself already into a considerable saving on costs and investment and also into a saving on building - and floor surface. The time during which the medium acts upon the poultry is shorter than the time during which the poultry usually stays in the conventional scalding apparatus, which results into a better appearance of the plucked poultry.

During the usual treatment of separately scalding and plucking the bird cools down when moved from the scalding to the plucking device, which partially neutralizes the effect of the scalding operation and impairs the plucking treatment. This drawback is obviously eliminated. The feathers can be discharged in a rather dry condition and there is no pollution of the sewage water, neither is there any transfer of bacteria from one bird to the other.

In a plucking device of the kind comprising on either side of the path of the poultry a plurality of oblong beams, situated above each other, and with plucking discs and plucking fingers protruding therefrom, the outflow openings are preferably provided on pipes which are disposed between and, if necessary, over and under the respective beams.

When the plucking device is of the kind comprising on either side of the path of the poultry a plurality of oblong supporting beams with plucking discs and plucking fingers protruding therefrom, then the pipes communicating with the outflow openings are preferably provided in these beams.

The plucking discs may be provided with an outflow opening which is coaxial with the axis of rotation thereof. The plucking discs may also carry plucking fingers in at least some of which is formed a channel communicating with a supply pipe for the medium and ending in an outflow opening.

It is also possible to construct the apparatus in such a way that always a number of lines, for instance through individual regulating devices, is connected to various sources of medium and with the associated outflow openings combined into a group.

A permeable conveyor belt is arranged under the plucking device with a receptacle for receiving water passed through the belt.

Preferably the collected water is after heating and purification, returned to the supply pipes.

SURVEY OF THE DRAWINGS

FIG. 3 shows diagrammatically a cross-section through yet another embodiment;

FIGS. 4 to 7 are perspective views of various embodiments of a beam with plucking discs, as used in the embodiments according to FIGS. 1 to 3 and provided with feed members for the medium.

Figure 1:
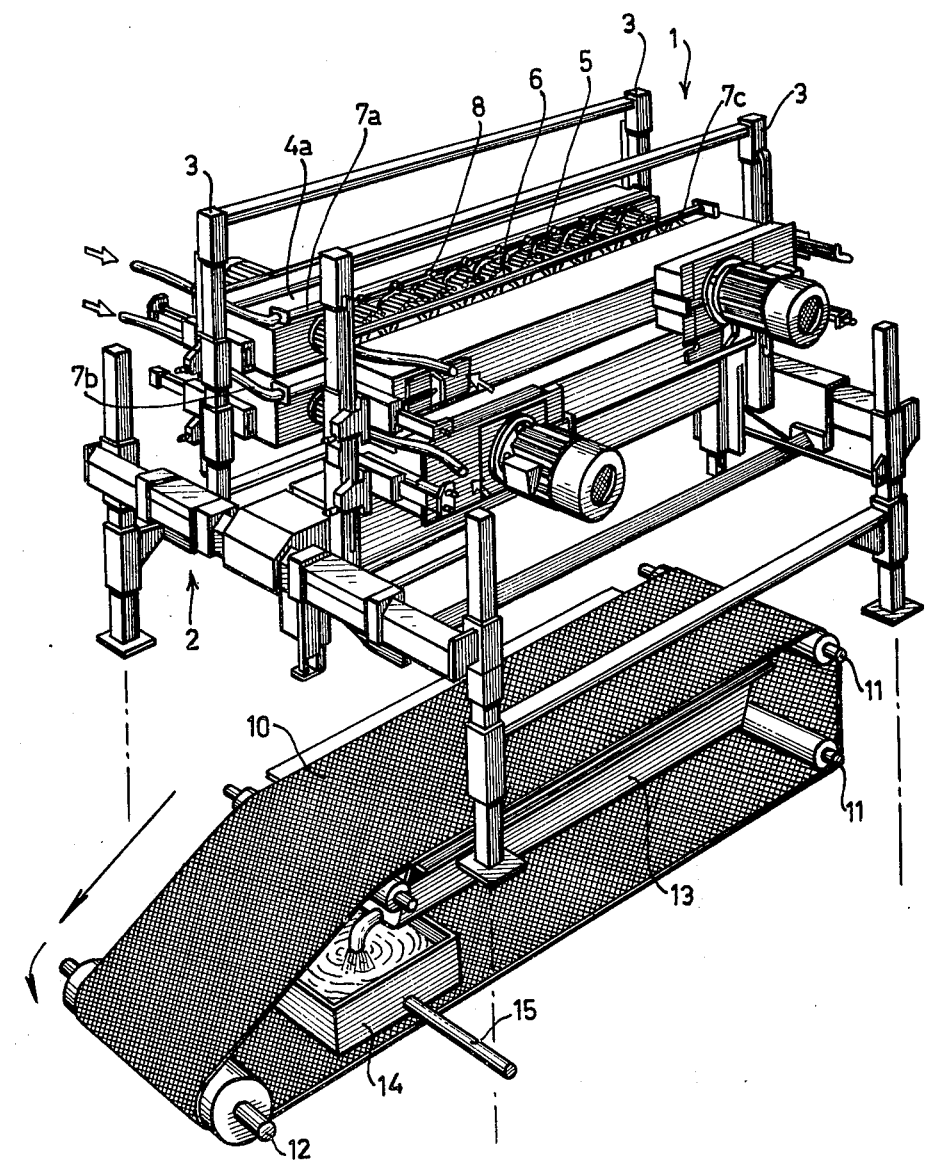
FIG. 1 is a perspective view of an embodiment according to the invention.

DESCRIPTION OF PREFERRED EMBODIMENTS:

FIG. 1 shows a perspective view of a plucker with plucking discs; the whole is denoted by the reference numeral 1. This plucker, which is known per se, consists of the frame 2 with vertical standards which carry the beams 4a, 4b, 4c and 4d. Each of these beams carry a plurality of aligned plucking discs 5 each set with axially protruding plucking fingers 6.

Along the front side of the beams 4a – 4d are disposed the pipes 7a – 7d with outflow openings 8 on the entire length of these pipes. These pipes can be connected via shut-off valves (not shown) to a source of a suitable scalding medium, like hot air, steam, warm water or a mixture thereof. In this way it is possible to subject the poultry during the plucking operation, when the birds are passed from between the two beams and are exposed to the action of the plucking fingers 8, also to the action of this medium. This allows to omit the usual scalding treatment which so far was performed as a pre-treatment of the poultry prior to the plucking proper. The scalding and plucking are thus performed in a single operation.

Arranged under the plucking machine is a conveyor belt 10 for the sake of clarity shown in the figures at too great a distance from the machine, which is guided via the rollers 11 and 12 and which is permeable to such an extent that moisture falling thereon drips through to the receptacle 13, the latter discharging the collected water to the container 14 the outlet 15 of which is connected to a pump (not shown). Feathers removed from the bird during the plucking operation are collected by the belt 10 and discharged.

When the plucking fingers are acting on the birds the feather package is opened thereby so that the usual scalding medium, steam or hot water, is freely admitted.

The water discharged via the pipe 15 can, after having been purified — if need be — be reheated or converted into steam and fed to the lines 7a – 7d. As a consequence the consumption of water is small and the pollution of the water considerably less than in the conventional systems.

Figure 2:
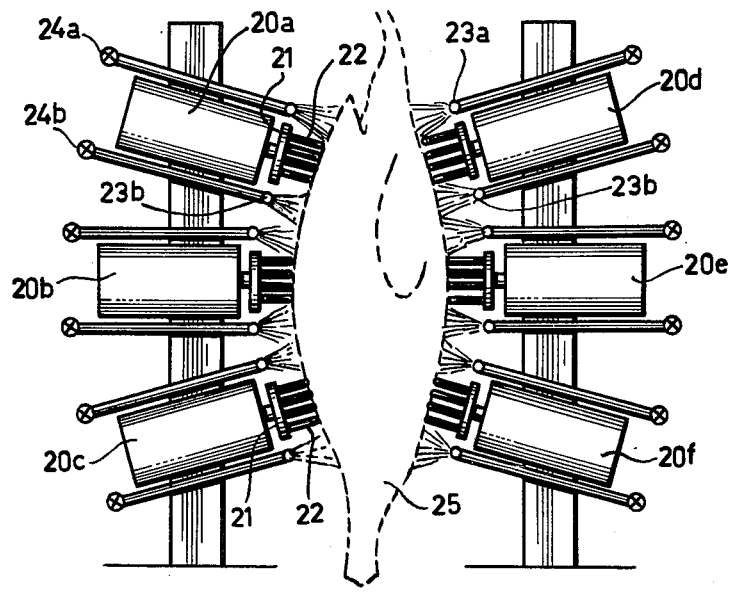
FIG. 2 represents diagrammatically a cross-section through another embodiment.

FIG. 2 shows a diagrammatical cross-section of an embodiment in which six beams with plucking members 20a – 20f are disposed in such a way that two rows of three are opposite each other. Each of the beams carries a number of discs 21 with plucking fingers 22.

Above and below each beam is disposed a pipe 23a, 23b with outflow openings, each with its own regulating cock 24a, 24b. In this way it is possible to regulate the supply of medium to the poultry at will, while e.g. some of the pipes 23a may be connected to a source of medium which is different from that to which the others are connected. As a consequence an optimal scalding effect can always be achieved.

The figure shows that the position of the beams 20a – 20f can be adjusted at will such that always an optimal treatment of the bird 25 is obtained. This possibility is also offered by the apparatus according to FIG. 1.

FIG. 3 shows an embodiment which corresponds with that according to FIG. 2, in this case, however, there is always a group of juxtaposed pipes 30a, 30b with outflow openings with associated regulating cocks 31a and 31b. The pipes 30a may e.g. be connected to a source of medium different from that to which the pipes 30b are connected; it is also possible to connect the four pipes of two juxtaposed groups, e.g. the group 30a', 30b' on the one hand and the group 30a'', 30b'' on the other hand, to four different sources of medium, e.g. steam, hot water, hot air, and a mixture of hot air and water.

FIGS. 4, 5, 6, 6a, 7a show embodiments of a beam with plucking discs and plucking fingers as may be used according to the invention. FIG. 4 shows the beam 40 with the driving motor 41 which via a gear (not shown) drives the discs 42; these discs carry in the usual way the axially directed plucking fingers 43. Provided along the upper wall of the beam is the pipe 44 with outflow openings 45, the pipe being connected via the flexible hose 46 and, if any, via a regulating cock to a suitable source of medium.

Figure 5:
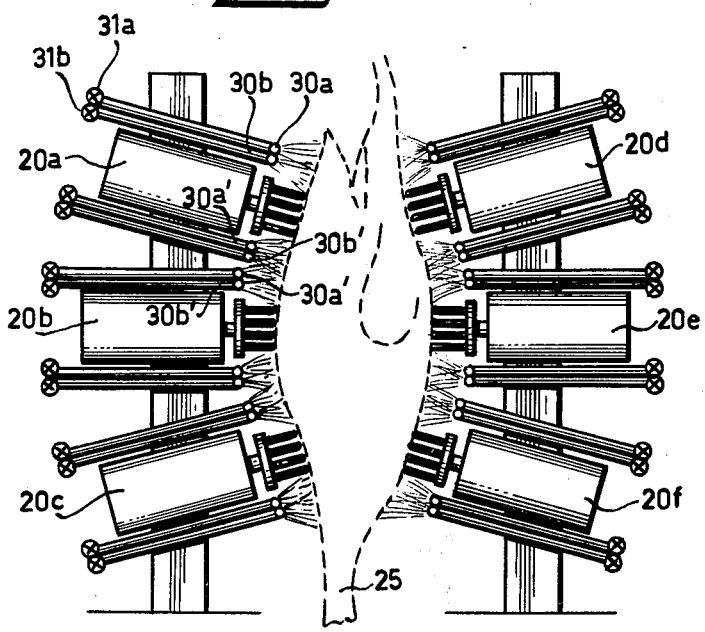

FIG. 5 shows the beam 50 with a driving motor 51 driving the discs 52 with the plucking fingers 53, while the pipe feeding the outflow openings 54 is arranged within the beam 50. The flexible hose is situated on the back side of the casing of the driving gear and is not visible in the Figure.

FIG. 6a shows a beam 60 with a driving motor 61 and plucking discs 62 constructed in a special way; they are hollow and have, as FIG. 6b shows, a central outflow opening 63, possibly combined with one or more outflow openings 64 in the front face of the disc 62. The disc is naturally also provided with the usual plucking fingers 65.

FIG. 7a shows an embodiment with a beam 70 with a driving motor 71 which drives the discs 62 which, like in the embodiment as shown in FIG. 6, are hollow but on which, like FIG. 7b shows, plucking fingers are provided one of which, denoted by 73', is represented on a larger scale in FIG. 7c. At least some of these fingers have a channel 74 extending longitudinally therein. The medium fed into the hollow space within the plucking discs 72 flows outwards via the channels 74 in the fingers 73 and is therefore, also owing to the action of the plucking fingers themselves, directly transferred to the skin of the poultry.

What I claim is:

1. Apparatus for processing slaugtered poultry which is hanging from a conveyor track by its legs and moved along a path, comprising a plucking device having a plurality of rotatable discs on either side of the path of the poultry, said disks having plucking fingers directed to the path of the poultry, said plucking device having pipe means with a plurality of outflow openings therein and in the proximity of the plucking discs said openings being directed towards said path, and said pipe means being connected to one or more sources of hot water, hot air, steam or another suitable medium or a mixture thereof such that during the plucking operation performed by the plucking fingers the poultry is exposed to the effect of the medium brought thereon via the outflow openings.

2. Apparatus according to claim 1, wherein the plucking device comprises a plurality of oblong beams situated above one another with plucking discs and plucking fingers protruding therefrom, and said pipes having said outflow openings therein disposed between and, if necessary, above and below the respective beams.

3. Apparatus according to claim 1, wherein the plucking device comprises on either side of the path of the poultry a plurality of oblong supporting beams, situated above each other, with said plucking discs protruding therefrom, and said pipes in these beams communicating with the outflow openings.

4. Apparatus according to claim 3, wherein at least some of the plucking discs are provided with an outflow opening which is coaxial to the axis of rotation thereof.

5. Apparatus according to claim 3, wherein the plucking discs carry plucking fingers in at least some of which is formed a channel ending in an outflow opening and communicating with a supply pipe for the medium.

6. Apparatus according to claim 1 and a permeable conveyor belt under the plucking device and a receptacle thereunder for collecting water passed through the belt.

* * * * *